(12) United States Patent
Laumen et al.

(10) Patent No.: US 7,808,899 B2
(45) Date of Patent: Oct. 5, 2010

(54) METHOD, APPARATUS AND SOFTWARE PROGRAM FOR EXTENDING THE FLOW OF INFORMATION WHEN TRANSMITTING A MESSAGE

(75) Inventors: Josef Laumen, Hildesheim (DE); Markus Trauberg, Velchede (DE); Andreas Schmidt, Braunschweig (DE); Sabine Van Niekerk, Salzgitter (NL)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/365,488

(22) Filed: Feb. 4, 2009

(65) Prior Publication Data

US 2009/0227275 A1     Sep. 10, 2009

Related U.S. Application Data

(63) Continuation of application No. 10/216,010, filed on Aug. 9, 2002.

(30) Foreign Application Priority Data

Aug. 10, 2001 (EP) .................................. 01119364
Oct. 29, 2001 (EP) .................................. 01125790

(51) Int. Cl.
*H04L 12/28* (2006.01)
*H04L 12/56* (2006.01)

(52) U.S. Cl. .................................. 370/230

(58) Field of Classification Search ................ 370/352, 370/252, 356, 390, 338, 401, 328, 524, 238, 370/256, 400, 432, 408, 392; 379/218, 201, 379/265, 88, 121, 114, 225, 219; 725/101, 725/105, 86; 455/503, 414, 466, 566, 411, 455/421; 709/203, 223, 231, 207, 232; 715/838
See application file for complete search history.

(56) References Cited

U.S. PATENT DOCUMENTS 5,878,215 A * 3/1999 Kling et al. ................. 709/207
6,125,281 A * 9/2000 Wells et al. ................. 455/466

(Continued)

FOREIGN PATENT DOCUMENTS

EP          0841796          5/1989

(Continued)

OTHER PUBLICATIONS

3rd Generation Partnership Project; Technical Specification Group Services and System Aspects, Service aspects; Stage 1 Multimedia Messaging Services (Release 4), Mar. 2001.
3rd Generation Partnership Project; Technical Specification Group Terminals; Multimedia Messaging Service (MMS); Functional Description; Stage 2 (Release 4), Jun. 2001.
Digitalcellular telecommunications system (Phase 2+); Technical Realization of the Short Message Service (SMS); (GMS 03.40 version 7.4.0 Release 1998), 1998.
Wireless Application Protocol WAP Multimedia Messaging Service Message Encapsulation MMS Draft SCD, Feb. 8, 2001.

*Primary Examiner*—Pankaj Kumar
*Assistant Examiner*—Prenell P Jones
(74) *Attorney, Agent, or Firm*—King & Spalding L.L.P.

(57) ABSTRACT

Methods, apparatuses and software programs which are used to facilitate the flow of information in terms of functionalities in the domain of at least one service provider, in particular of a multimedia message in the UMTS, this functionality having been requested by a subscriber (for example, reply charging or recall of the message), wherein the present invention proposes transmitting information which reveals whether implicated network units in the domain of service providers support the requested functionality and proposes limiting the maximum size of the reply messages for reply charging.

12 Claims, 3 Drawing Sheets

U.S. PATENT DOCUMENTS

| | | | | |
|---|---|---|---|---|
| 6,233,318 | B1* | 5/2001 | Picard et al. | 379/88.17 |
| 6,430,177 | B1* | 8/2002 | Luzeski et al. | 370/356 |
| 6,606,376 | B1* | 8/2003 | Trell | 379/102.06 |
| 6,956,832 | B1* | 10/2005 | Muhonen et al. | 370/310 |
| 7,027,408 | B2* | 4/2006 | Nabkel et al. | 370/252 |
| 7,054,626 | B2* | 5/2006 | Rossmann | 455/422.1 |
| 7,302,465 | B2* | 11/2007 | Ayres et al. | 709/203 |
| 7,460,857 | B2* | 12/2008 | Roach, Jr., Peter O. | 455/411 |
| 2001/0021247 | A1* | 9/2001 | Esfandiari et al. | 379/225 |
| 2002/0196741 | A1* | 12/2002 | Jaramillo et al. | 370/252 |
| 2003/0007482 | A1* | 1/2003 | Khello et al. | 370/352 |
| 2003/0065805 | A1* | 4/2003 | Barnes, Jr. | 709/231 |
| 2003/0135638 | A1* | 7/2003 | Brabson et al. | 709/232 |
| 2004/0223488 | A1* | 11/2004 | Roy | 370/352 |
| 2005/0021713 | A1* | 1/2005 | Dugan et al. | 709/223 |

FOREIGN PATENT DOCUMENTS

| | | |
|---|---|---|
| EP | 0833490 | 4/1998 |
| WO | 00/62573 | 10/2000 |
| WO | 01/37537 | 5/2001 |

* cited by examiner

METHOD, APPARATUS AND SOFTWARE PROGRAM FOR EXTENDING THE FLOW OF INFORMATION WHEN TRANSMITTING A MESSAGE

CROSS-REFERENCE TO RELATED APPLICATION

This application is a Continuation of U.S. application Ser. No. 10/216,010 filed Aug. 9, 2002, which claims priority to European Application No. 01119364.6 filed Aug. 10, 2001 and European Application No. 01125790.4 filed Oct. 29, 2001, the contents of which are hereby incorporated by reference in their entirety.

BACKGROUND OF THE INVENTION

The present invention relates to methods for extending the flow of information when transmitting a message, in particular a multimedia message, via a mobile radio network, in particular a UMTS network, and to corresponding apparatuses and software programs.

For the mobile radio system of the next generation UMTS (UMTS—Universal Mobile Telecommunications System), a variant of a mobile message service is currently being standardized which has a multimedia capability and is called MMS (MMS—Multimedia Messaging Service), see 3GPP TS 22.140 version 4.1.0, Release 4; Third Generation Partnership Project; Technical Specification Group Services and System Aspects; Service Aspects; Stage 1; Multimedia Messaging Service (MMS), and also 3GPP TS 23.140 version 4.3.0, Release 4; Third Generation Partnership Project; Technical Specification Group Terminals; Multimedia Messaging Service (MMS); Functional Description; Stage 2.

Messages having multimedia contents are merely called MMs for short (MM—Multimedia Message) in order to provide better distinction from the text messages of the SMS. In contrast to the SMS, there is no longer any limitation to pure text contents. The MMS will allow texts to be formatted on the basis of individual taste and will allow audio and video contents to be embedded into a message.

FIG. 1 shows the MMS network architecture on the basis of today's prior art from the point of view of 3GPP (Third Generation Partnership Project). An MMS User Agent (abbreviation: UA) is understood to be an application, for example on a mobile radio telephone or on a unit connected to a mobile radio telephone (e.g., a laptop, or the like), which implements MMS. The application from which a message is sent is referred to below as the transmitting application, in the specific MMS Agent A (abbreviated to UAA in this case), and the application that receives is referred to as the receiving application, in the specific MMS User Agent B (abbreviated to UAB in this case). In accordance with FIG. 1, a transmitting application UAA 1 uses an air interface, denoted by MM1, to send an MM via a radio network 7 to the network unit 5, denoted by MMS Relay/Server A (abbreviated to RSA in this case; MMS Relay/Server is abbreviated to RS below), which provides the MMS functionality for the UAs in the domain of an MMS service provider 3 (MMS Service Provider A), the "MMSE" (MMSE—Multimedia Messaging Service Environment). An interface MM4 is then used to forward the message to a network unit 6, denoted by MMS Relay/Server B (RSB for short), in the domain of a recipient MMS service provider 4 (MMS Service Provider B), which in turn uses an interface MM1 to transmit the message to the receiving application UAB 2 via a radio network 8.

FIG. 1 shows the general case in which the originator network unit RSA 1 and the recipient network unit RSB 2 are not identical. The special case of just one MMSE involved is also known in the prior art, however, as is the fact that the interface MM1 does not necessarily need to be in the form of an air interface.

A feature of the MMS for the aforementioned special case of the originator and recipient RSs being identical (which feature is described in the above specification 3GPP TS 23.140 version 4.3.0, Release 4) is "Reply-Charging", on the basis of which an originator sending an MM can express his/her readiness to accept the costs for a reply message, in particular a multimedia reply (Reply-MM), from the recipient. In this context, the originator can additionally specify a time limit as well. If an MM with appropriate reply charging identification is available to the recipient for downloading on the network element RS, the recipient is first notified and can then download the MM to his/her terminal. In this context, the recipient is informed, both in the notification and when downloading the MM, of the fact that he/she can send a reply message relating to this "Original-MM" free of charge. If he/she wishes to make use of this, he/she need merely identify an MM compiled on his/her terminal as a Reply-MM relating to the previously received Original-MM and send it off. The reply charging functionality has to date been defined only within an MMSE. A detailed description can be found in annex E of 3GPP TS 23.140 version 4.3.0, Release 4.

All the information required for transporting an MM is entered, like the complementary information for the reply charging functionality, as information elements into the abstract messages defined in 3GPP TS 23.140 version 4.3.0, Release 4. If a unit involved in the data interchange (application UA or network element RS) does not detect an information element, this information element is passed through unaltered. This behavior may be problematical for the reply charging functionality, since the above-described reply charging functionality based on the prior art works only if all the units involved in the data interchange (that is to say, both UAs and the RS) support the reply charging functionality. If, by way of example, only the transmitting application UAA and the receiving application UAB support the reply charging functionality, and the network element RS involved does not (perhaps because it supports an obsolete MMS version), the network element RS is not able to detect a Reply-MM and may not be able to reject it; i.e., the originator of the Reply-MM (=recipient of the Original-MM) incorrectly still believes that the costs for the Reply-MM which he/she has sent are being accepted by the recipient (=originator of the Original-MM).

The standardization committees 3GPP and WAP Forum are aware of a solution neither to the compatibility problem described above (network element RS does not support reply charging functionality) nor to the broadening of the reply charging functionality to cover a number of MMSEs.

The problem described also arises in other cases of a similar nature in which an originator requests a particular functionality from a service provider, without the originator and/or the recipient knowing whether the correspondingly implicated network units in the domain of one or more service providers support the requested functionality. By way of example, discussions are being held regarding the future introduction of other new functions, such as "Recall of MMS", in the MMS which, although supported by the transmitting and receiving units, may not be supported by network units that are involved.

Another problem in the prior art is that the originator of an original message containing a reply charging indicator cannot protect oneself against the recipient sending an excessively long and, hence, very expensive reply message back.

It is an object of the present invention, therefore, to make transmitting information more user friendly when sending/receiving a message which contains a request for a particular functionality from an involved network unit in the domain of a service provider.

SUMMARY OF THE INVENTION

The present invention solves the compatibility problem arising in the prior art by virtue of, in accordance with a first embodiment of the present invention, the information regarding support of the requested reply charging functionality by the originator and/or recipient network units being transmitted between the units involved in the data interchange. In this context, in a first case, the originator and recipient network units, that is to say the relevant network elements RS in the domain of an MMS service provider, are identical. According to the present invention, the information relating to the acknowledgement from the relevant network unit is transmitted to the receiving application, in particular. Similarly, corresponding acknowledgement to the transmitting application is part of the present invention. Reception of this information on the part of the transmitting and/or receiving application is likewise part of the present invention.

On the basis of this embodiment, the present invention also allows expansion of the requested functionality, that is to say, for example, of the reply charging functionality or the message recall functionality when recall is requested by the originator, so that it also covers transmitting and receiving applications which use the MMS of different MMS service providers (that is to say, between two MMSEs). Transmitting additional data, namely the information regarding whether a network element RS supports the requested functionality, when transporting an MM on the two path sections from the originator network element RS (MMS Relay/Server of the originator) to the recipient element RS (MMS Relay/Server of the recipient) or from the recipient network element RS to the receiving application UAB permits the requested functionality between different MMSEs as well and solves the compatibility problem described above.

Accordingly, transmitting the information regarding whether a network element RS supports the requested functionality as a direct reaction to the sending of an MM on the path section from the network element RS to the receiving application UAB can significantly increase the convenience of the functionality in question.

On the basis of a second embodiment, the present invention affords the opportunity of, when the originator and recipient network units are different than one another, transmitting additional information from the originator network unit to the recipient network unit; in particular, the indication of the reply charging option to the recipient, the identification number for reply charging, which preferably corresponds to the identification number of the original message, a time limit for replying to the original message and/or the maximum permissible size of the reply message.

On the basis of a third embodiment of the present invention, the originator is generally given the option of specifying a maximum limit for the size of a reply message for reply charging. This can be achieved using a number of upper limits, for example, from which the originator of the original message selects one. Alternatively, the originator can define a maximum size for the reply message which he/she has chosen. The originator is thus assured of the fact that the reply message will not generate more costs than the originator oneself has chosen.

Besides the methods, the present invention also covers the corresponding apparatuses involved; that is to say, the network units with the corresponding control units and also the mobile radio subscriber units equipped with the corresponding receiving and/or transmitting applications. In this context, it makes no difference, as already stated above, whether these applications are installed directly on a mobile radio telephone or on a laptop, Notebook or the like. The term "mobile radio subscriber unit" also covers these embodiments. In addition, the corresponding software programs are also part of the present invention.

Additional features and advantages of the present invention are described in, and will be apparent from, the following Detailed Description of the Invention and the Figures.

DETAILED DESCRIPTION OF THE INVENTION

The text below describes, using the special functionality "Reply-Charging" by way of example, how the compatibility problem referred to above can be eliminated within an MMSE by interchanging additional information on the interface MM1 (case 1). An extension of the method presented to cover the general case is then presented, in which MMs are interchanged between various MMSEs of different MMS service providers (case 2). In this context, alterations affect not only the interface MM1 but also the interface MM4. Finally, one possible implementation of the method described in the general case 2 (interchange of MMs between two MMSEs) is presented for the interface MMI in the form of an air interface in WAP (WAP—Wireless Application Protocol).

I. Case 1: Reply Charging within a Single MMSE

Figure 1:
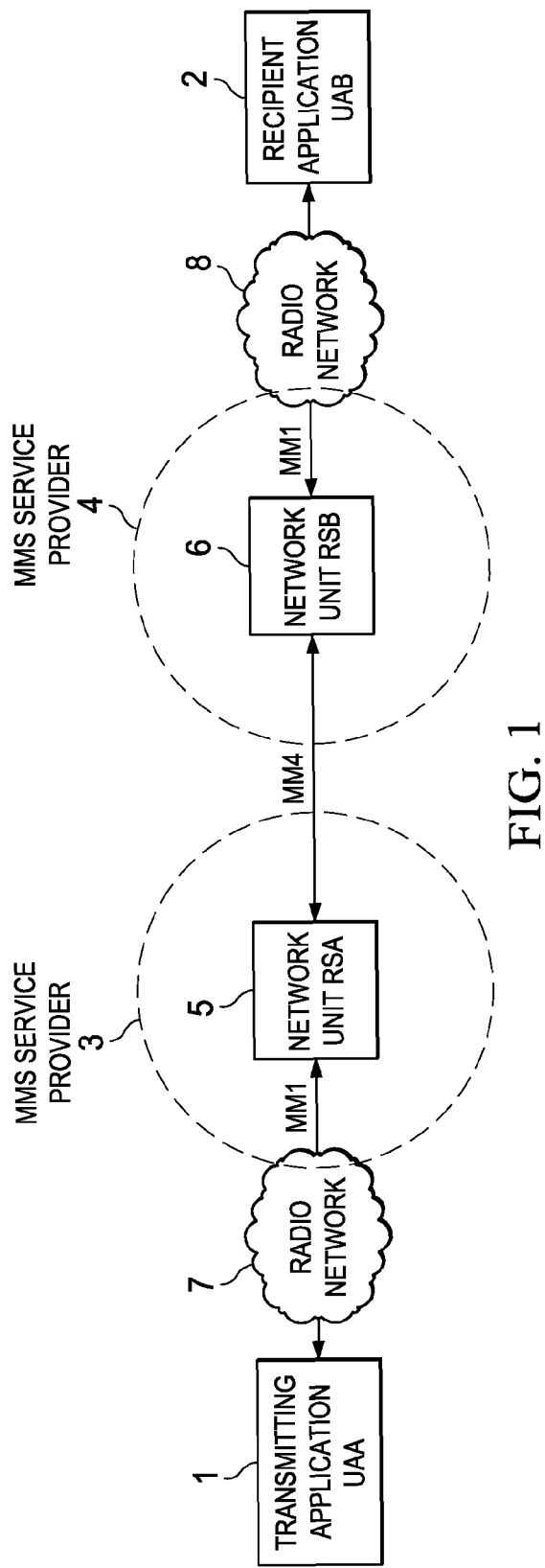
FIG. 1 shows the MMS network architecture in accordance with the specifications of the 3GPP.
Figure 2:
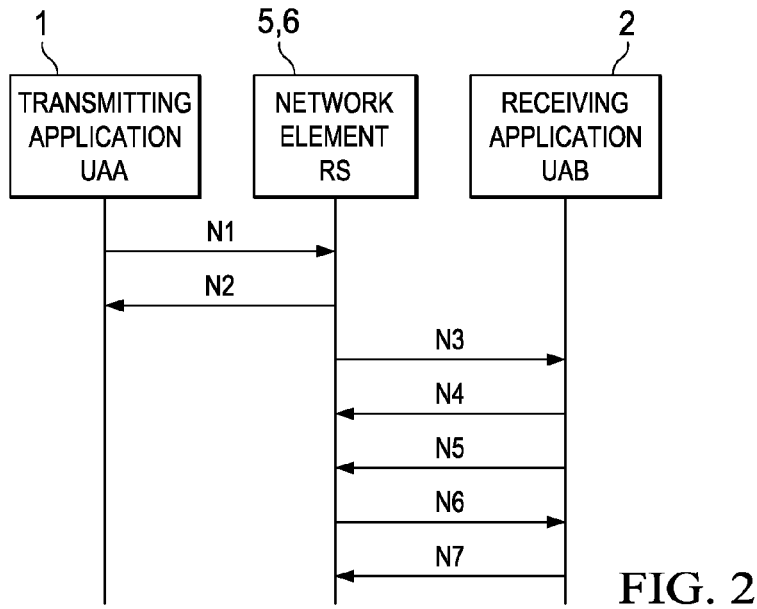
FIG. 2 shows the transaction flowchart for the case where an MM is sent from a transmitting application (UAA) to a receiving application (UAB) with the involvement of only one network element RS.

First, FIG. 2 is used to consider the case in which both the transmitting application UAA 1 (MMS User Agent A) and the receiving application UAB 2 (MMS User Agent B) use the MMS of the same MMS service provider; i.e., the MM is transported only within one MMSE. FIG. 2 shows the associated "transaction flowchart" in line with 3GPP, which shows the abstract messages defined in 3GPP TS 23.140 version 4.3.0, Release 4. User A creates an MM, identifies it with "Reply-Charging" and sends it using the abstract message N1 (MM1_submit.REQ) via the interface MM1 to the network element RS in the MMSE of his/her MMS service provider. This RS is an originator network element and a recipient network element at the same time and is therefore identified by the two reference symbols 5 and 6 (cf. FIG. 1). The network element RS 5, 6 acknowledges correct reception of the MM from the transmitting application UAA 1 using the abstract message N2 (MM_subunit.RES) and notifies the recipient B about the MM which is ready for downloading using the abstract message N3 (MM1_notification.REQ). The abstract message N4 (MM1_notification.RES) serves merely as acknowledgement of correct reception of the notification by the receiving application UAB 2. The abstract message N5 (MM1_retrieve.REQ) can be used by user B to initiate downloading of an MM available on the network element RS 5, 6. The network element RS 5, 6 delivers the MM to the receiving application UAB 2 using the abstract message N6 (MM1_retrieve.RES). This is then acknowledged using the abstract message N7 (MM1_acknowledgement.REQ).

According to the present invention, a network element RS adds another information element to the two abstract messages N3 (MM1_notification.REQ=notification by means of an MM) and/or N6 (MM1_retrieve.RES=delivery of the MM) if the network element RS supports the demanded reply charging functionality. The new information element could be called "Reply-Charging-Support", for example. It indicates whether the network element RS (or more generally, the MMS service provider) supports the reply charging functionality. Tables 1 and 2 show the inventive additions, i.e. the new information element "Reply-Charging-Support", in the abstract messages N3 (MM1_notification.REQ) and N6 (MM1_retrieve.RES), which in both cases is preferably inserted behind the known information element "Reply-Charging".

TABLE 1

Additional information element in the abstract messages N3 (MM1_notfication.REQ) and N6 (MM1_retrieve.RES) in accordance with case 1.

| Information element | Presence | Description |
| --- | --- | --- |
| "Reply-Charging-Support" | Optional | Information that the MMS service provider supports the reply charging functionality. |

A network element RS which does not support the demanded reply charging functionality preferably continues to pass through unaltered all information elements which are not known to it, without adding the information element "Reply-Charging-Support". In this way, the recipient's receiving application UAB is able to detect whether or not the reply charging functionality is supported in the MMSE of its MMS service provider and to react accordingly. In other words: only if the information element "Reply-Charging-Support" set by the network element RS is present in the abstract messages N3 (MM1_notification.REQ) and/or N6 (MM1_retrieve. RES) is the recipient of the Original-MM able to be certain, when sending an appropriately identified Reply-MM, that the reply charging functionality is supported by the MMS service provider.

To increase the convenience of the reply charging functionality, the information element "Reply-Charging-Support" newly defined above is preferably also inserted into the abstract message N2 (MM1_submit.RES) used to acknowledge correct reception of an MM after the network element RS has sent it (see FIG. 2). In this way, after an Original-MM containing a reply charging identifier has been sent, the transmitting application UAA 1 can be informed, like the receiving application UAB 2 after a Reply-MM with appropriate identification has been sent, about whether or not the MMS service provider supports the demanded reply charging functionality. Table 2 shows the additional information element "Reply-Charging-Support" for the abstract message N2 (MM1_submit.RES), which information element is preferably inserted behind the known information element "Message ID".

TABLE 2

Additional information element in the abstract message N2 (MM1_submit.RES) in accordance with case 1.

| Information element | Presence | Description |
| --- | --- | --- |
| "Reply-Charging-Support" | Optional | Information that the MMS service provider supports the reply charging functionality. |

II. Case 2: Reply Charging Between Two Different MMSEs

The text below considers the case in which the transmitting application UAA and the receiving application UAB use the MMS of different MMS service providers; i.e., an MM containing a reply charging identifier is transported between two MMSEs. In this case, reply charging works properly only if, besides the transmitting and receiving applications, both the network element RSA of the originator and the network element RSB of the recipient support the reply charging functionality. In this context, the present invention solves the compatibility problem for the reply charging between different MMSEs by concomitantly transmitting additional information when transporting an MM, which additional information indicates whether the reply charging functionality is supported by the appropriate network element (RSA, RSB).

Figure 3:
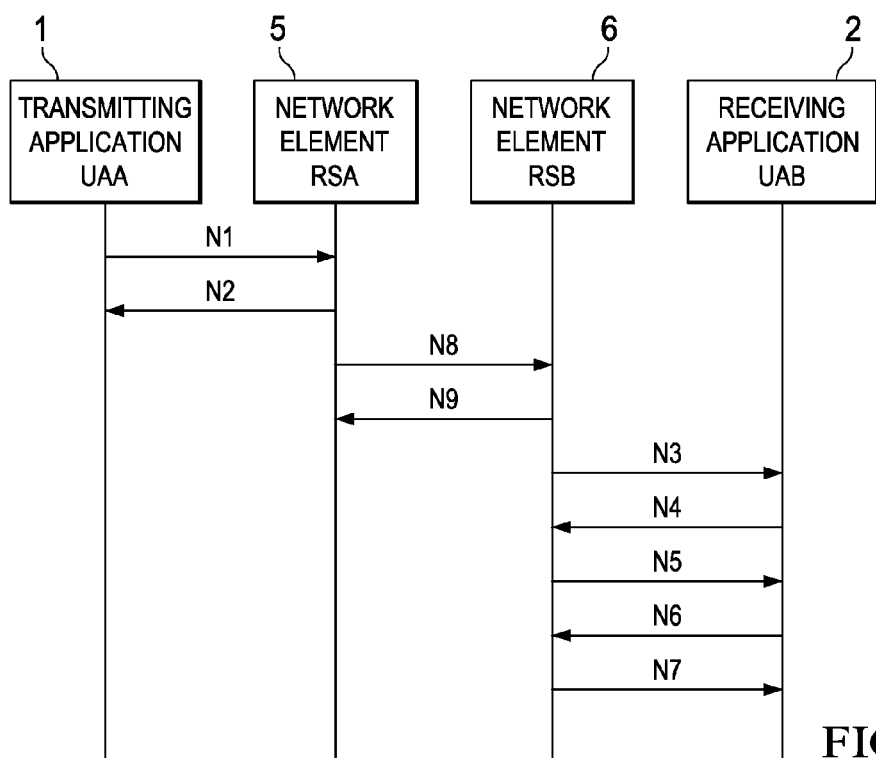
FIG. 3 shows the transaction flowchart for the case where an MM is sent from a transmitting application (UAA) to a receiving application (UAB) with the involvement of two network elements (RSs).

FIG. 3 shows an appropriate extension to the transaction flowchart from FIG. 2. In addition to the abstract messages shown in that case, FIG. 3 also shows the abstract messages for the interface MM4 (cf also FIG. 1).

In accordance with FIG. 3, user A creates an MM, identifies it with "Reply-Charging" and sends it via the interface MM1 to the network element RSA 5 in the MMSE of his MMS service provider A. In accordance with the present invention, if the MMS service provider A supports the demanded reply charging functionality, the network element RSA 5 forwards the following information together with the MM to the network element RSB 6 in the recipient's MMSE in the abstract message N8 (MM4_forward.REQ)—the message N9 (MM4_forward.RPS) in FIG. 3 does not need to be explained in the present case:

1. The readiness of the originator to accept the costs for a Reply-MM from the recipient (information element "Reply-Charging"), 2. A time limit for sending a free-of-charge Reply-MM (information element "Reply-Charging-Deadline"), 3. The maximum size of a Reply-MM (information element "Reply-Charging-Size"), 4. The information that or regarding whether the originator's MMS service provider supports the demanded reply charging functionality (information element with the exemplary name "Reply-Charging-Support-At-Originator-MMSE"), or (if the transmitted MM is a Reply-MM; in this case, the Reply-MM is deemed to be a new Original-MM):

The Message-ID of the (initial) Original-MM (information element "Reply-Charging-ID".

Table 3 shows the inventively additional information elements in the abstract message N8 (MM4_forward.REQ), with the new information element "Reply-Charging-ID"

preferably being inserted behind the known information element "Message ID", and the other four new information elements being inserted behind the known information element "Content".

TABLE 3

Additional information elements in the abstract message N8 (MM4_forward.REQ) in accordance with case 2.

| Information element | Presence | Description |
| --- | --- | --- |
| "Reply-Charging-ID" | Optional | In the case of reply charging, this is the identification of the Original-MM to which a reply is given. |
| "Reply-Charging" | Optional | Information that the reply to this specific Original-MM is free of charge. |
| "Reply-Charging-Deadline" | Optional | In the case of reply charging, the last instant for sending a reply to which the recipient is entitled. |
| "Reply-Charging-Size" | Optional | In the case of reply charging, the maximum size of a Reply-MM to which the recipient is entitled. |
| "Reply-Charging-Support-at-Originator-MMSE" | Optional | Information that the reply charging functionality is supported by the originator network element (RS). |

The information elements "Reply-Charging", "Reply-Charging-Deadline" and "Reply-Charging-ID" appearing in Table 3 do not need to be newly defined at this point. They are already used on the interface MM1, as is known, and, in accordance with the present invention, are transmitted to the new interface MM4 in this case. The information element "Reply-Charging-Support-At-Originator-MMSE" is discussed in more detail below:

For the case described here, it is no longer sufficient to accept the information element "Reply-Charging-Support" defined above in case 1 for transmitting the information regarding whether the MMS service provider supports the demanded reply charging functionality, because the network element RSB 6 would pass on the information element "Reply-Charging-Support" set by the network element RSA 5 in unaltered form to the receiving application UAB 2 during notification or delivery of the MM if it does not support the reply charging functionality. This behavior could be interpreted incorrectly by the receiving application UAB 2. It requires the information regarding whether both network elements 5, 6 (RSA, RSB) involved in transmitting the MM support the demanded reply charging functionality. For this reason, the present invention defines a different information element on the interface MM4 between network element RSA 5 and network element RSB 6 than on the interface MM1 between network element RSB 6 and receiving application UAB 2. The two new information elements could, by way of example, be called "Reply-Charging-Support-at-Originator-MMSE" and "Reply-Charging-Support-at-Recipient-MMSE". They are shown in tables 3, 5 and 6. In the abstract messages N3 (table 5) and N6 (table 6), the information element "Reply-Charging-Support-at-Recipient-MMSE" is preferably inserted behind the information element "Reply-Charging".

If the network element RSB supports the reply charging functionality, it needs to check before the recipient is notified, or before the MM is delivered, whether the abstract message N8 (MM4_forward.REQ) contains the appropriate information element "Reply-Charging-Support-at-Originator-MMSE". If this is the case, the network element RSB, for its part, now needs to insert the appropriate information element "Reply-Charging-Support-at-Recipient-MMSE" into the abstract message N3 (MM1_notification.REQ=notification about the MM available for downloading) or into the abstract message N6 (MM1_retrieve.RES=delivery of the MM). Optionally, it may also delete the information element "Reply-Charging-Support-at-Originator-MMSE" set by the network element RSA again after the check has been carried out if and insofar as it is able to detect it, in order to reduce the load on the precious air interface. The receiving application UAB of the recipient can use this method, by evaluating the existence or absence of the information element "Reply-Charging-Support-at-Recipient-MMSE", as a simple way of detecting whether or not both MMS service providers involved are able to process the sending of a Reply-MM relating to the Original-MM.

The information element "Reply-Charging-Size", which denotes the permissible size of the Reply-MM, is likewise the subject matter of this inventive entry. It is preferably added to the abstract messages N1 (MM1_submit.REQ), N8 (MM4_forward.REQ), N3 (MM1_notification.REQ) and N6 (MM1_retrieve.RES) in order to increase the convenience of the reply charging functionality. This new information element provides the originator of an Original-MM with the opportunity to stipulate not only the time limit for the Reply-MM but also the maximum size thereof. Alternatively, or in addition, it also could be used by one of the MMS service providers involved in transmitting the MM in order to restrict the size of a Reply-MM. Tables 3 to 6 show the newly defined information element "Reply-Charging-Size" in the appropriate abstract messages, this information element being inserted into the abstract messages N1, N3 and N6 preferably behind the known information element "Reply-Deadline" in each case.

TABLE 4

Additional information element in the abstract message N1 (MM1_submit.REQ).

| Information element | Presence | Description |
| --- | --- | --- |
| "Reply-Charging-Size" | Optional | In the case of reply charging, the maximum size of a Reply-MM to which the recipient is entitled. |

TABLE 5

Additional information elements in the abstract message N3 (MM1_notification.REQ) in accordance with case 2.

| Information element | Presence | Description |
| --- | --- | --- |
| "Reply-Charging-Support-At-Recipient-MMSE" | Optional | Information that the reply charging functionality is supported by the recipient-end network element. |
| ... | ... | ... |
| "Reply-Charging-Size" | Optional | In the case of reply charging, the maximum size of a Reply-MM to which the recipient is entitled. |

TABLE 6

Additional information elements in the abstract message N6 (MM1_retrieve.RES) in accordance with case 2.

| Information element | Presence | Description |
| --- | --- | --- |
| "Reply-Charging-Support-At-Recipient-MMSE" | Optional | Information that the reply charging functionality is supported by the recipient-end network element. |
| ... | ... | ... |

TABLE 6-continued

Additional information elements in the abstract message N6 (MM1_retrieve.RES) in accordance with case 2.

| Information element | Presence | Description |
| --- | --- | --- |
| "Reply-Charging-Size" | Optional | In the case of reply charging, the maximum size of a Reply-MM to which the recipient is entitled. |

In a similar manner to the procedure described in case 1, the information element "Reply-Charging-Support-At-Originator-MMSE" introduced in this case is advantageously also inserted into the abstract message N2 (MM1_subunit.RES) used by a network element RS to acknowledge correct reception of an MM. This significantly increases the convenience of the reply charging functionality because it makes it possible to inform both the transmitting application UAA, after an Original-MM with a reply charging identifier has been sent, and the receiving application UAB, after a correspondingly identified Reply-MM has been sent (in this case, the receiving application UAB is the "Originator" of the Reply-MM), about whether or not the respective MMS service provider supports the demanded reply charging functionality. Table 7 shows the additional information element "Reply-Charging-Support-At-Originator-MMSE" in the abstract message N2 (MM1_submit.RES), which is preferably inserted behind the information element "Message ID".

TABLE 7

Additional information element in the abstract message N2 (MM1_submit.RES) in accordance with case 2.

| Information element | Presence | Description |
| --- | --- | --- |
| "Reply-charging-Support-At-Originator-MMSE" | Optional | Information that the reply charging functionality is supported by the network element RS when an Original-MM or a Reply-MM has been sent. |

III. Implementation of the Present Invention in WAP

On the basis of the current prior art, MMS can be implemented only using WAP (WAP—Wireless Application Protocol). To bridge the air interface (in 3GPP: MM1) between a terminal suitable for MMS and the WA-P gateway, 3GPP TS 22.140 version 4-1.0, Release 4 (see above) and WAP-209.102-MMSEncapsulation, Feb. 8, 2001 (Wireless Application Protocol; WAP Multimedia Messaging Service; Message Encapsulation; MMS Draft SCD) provide for the use of the WA-P WSP Transfer Protocol. The section which now follows, therefore, describes how the 3GPP abstract-messages information elements newly defined above for the purposes of reply charging can be transferred to the WAP messages of the WA-P implementation. In this context, by way of example, the variant embodiment in accordance with case 2 (reply charging between two MMSEs) is implemented, because it portrays the more general case and can be afforded the greater opportunities for implementation in 3GPP and WA-P. This is because, ultimately, it eliminates the limitation to just one MMSE.

Figure 4:
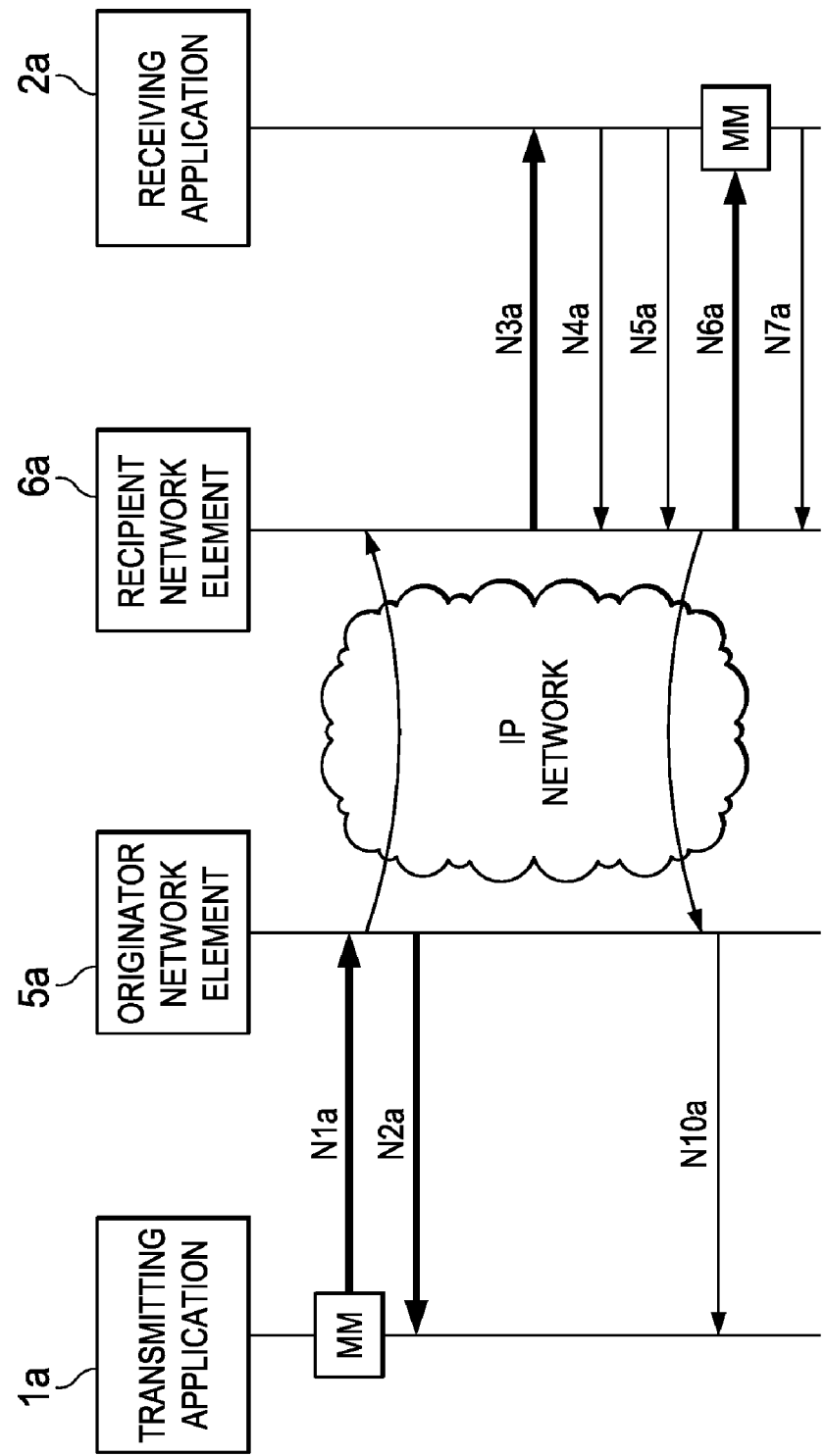
FIG. 4 shows the transaction flowchart in the WAP for the case where an MM is sent from a transmitting application (CA) to a receiving application (CB) with the involvement of two network elements (PRs).

FIG. 4 shows a "transaction flowchart" in WA-P based on the current prior art in accordance with WAP-209.102-MMSEncapsulation (see above), illustrating the interchange of WAP messages between the four instances involved, transmitting application 1a (MMS Client A, abbreviated to CA), originator network element 5a (MMS Proxy-Relay A, abbreviated to PRA), recipient network element 6a (MMS Proxy-Relay B, abbreviated to PRB) and receiving application 2a (MMS Client B, abbreviated to CB), when transmitting an MM. The WAP messages affected by this inventive entry, N1a (M-Send.req), N2a (M-Send.conj), N3a (M-Notification.ind) and N6a (M-Retrieve.conf), are highlighted in bold in this case. In this context, the WAP message N1a corresponds to the aforementioned message N1, the WAP message N2a corresponds to the aforementioned message N2, etc. In addition, the known message N10a (M-Delivery.ind) is shown. As a pointer, it may be noted here that the terms defined in 3GPP, MMS User Agent, MMS Relay/Server and MMSE, do not exist in WAP. For this reason, this section uses only the terms MMS Client and MMS Proxy-Relay and their abbreviations, but these terms refer to the same instances. For the 3GPP term MMSE, no similar expression exists in WAP.

In accordance with WAP-209.102-MMSEncapsulation (see above), a header field in a WA-P message includes a field name followed by a field value having at least one octet (8-bit word). The association between hexadecimal values and the field names is shown in table 8. At present, 24 field names exist. The field names newly defined in this inventive entry, therefore, preferably start at number 25 (hexadecimal: 0x19). They are shown in table 9.

TABLE 8

Allocation of the field names (according to prior art).

| Name | Allocated Numbers |
| --- | --- |
| Bcc | 0x01 |
| Cc | 0x02 |
| Content-Location | 0x03 |
| Content-Type | 0x04 |
| Date | 0x05 |
| Delivery-Report | 0x06 |
| Delivery-Time | 0x07 |
| Expiry | 0x08 |
| From | 0x09 |
| Message-Class | 0x0A |
| Message-ID | 0x0B |
| Message-Type | 0x0C |
| MMS-Version | 0x0D |
| Message-Size | 0x0E |
| Priority | 0x0F |
| Read-Reply | 0x10 |
| Report-Allowed | 0x11 |
| Response-Status | 0x12 |
| Response-Text | 0x13 |
| Sender-Visibility | 0x14 |
| Status | 0x15 |
| Subject | 0x16 |
| To | 0x17 |
| Transaction-Id | 0x18 |

TABLE 9

Newly defined field names in accordance with the present invention.

| Name | Allocated Numbers |
| --- | --- |
| Reply-Charging-Support-At-Originator-MMS-Proxy-Relay | 0x19 |
| Reply-Charging-Support-At-Recipient-MMS-Proxy-Relay | 0x1A |
| Reply-Charging-Size | 0x1B |

Since, in accordance with WAP-209.102-MMSEncapsulation (see above), a header field in a WAP message always includes a field name and a field value, at least one field value needs to be defined for each of the header fields newly defined here. This is explained in more detail below:

There are a total of four options for coding the field value for a header field, with the first octet settling the type and length of the coding (see table 10).

TABLE 10

The four options for coding the field value (prior art).

| First Octet of the field value | Possible combinations | Number of subsequent Octets |
|---|---|---|
| 0 ... 30 | 31 | 0 ... 30 |
| 31 | 1 | >30 |
| 32 ... 127 (Text) | 96 | >0 |
| 128 ... 255 | 128 | 0 |

To keep down the quantities of data to be transmitted on the air interface, the field values for the two newly defined header fields "Reply-Charging-Support-At-Originator-MMS-Proxy-Relay" and "Reply-Charging-Support-At-Recipient-MMS-Proxy-Relay" preferably come exclusively from the fourth value range (128 to 255). One possible definition of the new header fields "Reply-Charging-Support-At-Originator-MMS-Proxy-Relay" and "Reply-Charging-Support-At-Recipient-MMS-Proxy-Relay" could have the following appearance:

Field-Name: Reply-Charging-Support-At-Originator-MMS-Proxy-Relay
Field-Values: Reply-charging-Support-At-Originator-MMS-Proxy-Relay-value=Yes|No
  Yes=<Octet 128>
  No=<Octet 129>
Field-Name: Reply-Charging-Support-At-Recipient-MMS-Proxy-Relay
Field-Values: Reply-Charging-Support-At-Recipient-MMS-Proxy-Relay-value=Yes|No
  Yes=<Octet 128>
  No=<Octet 129>

The field value for the newly defined header field "Reply-Charging-Size" could be specified either in stages (Reply-MM may have a size of up to X, Y or Z kilobytes) or in explicit terms (Reply-MM may have a size of X kilobytes only). One possible definition of the new header field "Reply-Charging-Size" with gradation of the possible size of a reply message could have the following appearance (value range 4):

Field-Name: Reply-Charging-Size
Field-Values: Reply-Charging-Size-value=200|400|600|800
  200=<Octet 128>
  400=<Octet 129>
  600=<Octet 130>
  800=<Octet 131>

One possible definition of the new header field "Reply-Charging-Size" with explicit specification of the possible size of a reply message could have the following appearance (value range 1):

Field-Name: Reply-Charging-Size
Field-Values: Reply-Charging-Size-value=Long-integer Other coding options will not be discussed in more detail at this point. It is obvious that various coding options exist within the scope of the present invention.

The inventive additions to the WAP messages N1a (M-Send.req), N2a (M-Send.conf), N3a (M-Notification.ind) and N6a (M-Retrieve.conf) are illustrated in tables 11 to 14. The rest of the header fields required for implementing the reply charging functionality within an MMSE are not shown there, because the precise implementation of the information elements defined in 3GPP in the WAP forum is currently not yet complete. In the WAP message N1a (M-Send.req), the header field "Reply-Charging-Size," preferably inserted behind the header field "Content-Type," as been added and can be used, by the application CA 1a wishing to use the reply charging functionality, not only for specifying a time limit but also for limiting the size of the Reply-MM when sending the MM.

TABLE 11

Newly defined header field in the WAP message N1a (M-Send.req).

| Name | Content | Comment |
|---|---|---|
| "X-Mms-Reply-Charging-Size" | Value for reply charging size | Optional. Specifies the size of a Reply-MM. |

In the WAP message N2a (M-Send.conf) the header field "Reply-Charging-Stupport-At-Originator-MMS-Proxy-Relay," preferably inserted behind the header field "Message-ID," has been added and can be used to notify the transmitting application CA 1a which has sent an MM whether the appropriate network element PRO 5A has understood/accepted the originator's readiness to accept the costs for a Reply-MM or a Reply-MM relating to a previously received and appropriately identified Original-MM.

TABLE 12

Newly defined header field in the WAP message N2 (M-Send.conf).

| Name | Content | Comment |
|---|---|---|
| "X-Mms-Reply-Charging-Support-At-Originator-MMS-Proxy-Relay" | Value for reply charging support at the originator MMS proxy relay | Optional. Indication of whether the reply charging is supported at the originator end. |

The WAP messages N3a (M-Notification.ind) and N6a (AM-Retrieve.conf) contain (besides the possibly available information that the network element PR 5a of the originator supports the reply charging functionality) the header field "Reply-Charging-Support-At-Recipient-MMS-Proxy-Relay" set by the network element PR 6a of the recipient. For the receiving application CB 2a of the recipient, however, only the existence or absence of the header field "Reply-Charging-Support-At-Recipient-MMS-Proxy-Relay" is important. This is preferably set only if both the originator network element PRA 5a and the recipient network element PRB 6a support the reply charging functionality. If it is present, the receiving application CB 2a can be sure that a Reply-MM relating to a previously received Original-MM is understood by the two MMS service providers involved. The header field "X-Mms-Reply-Charging-Support-At-Recipient-MMS-Proxy-Relay" preferably has been inserted behind the known header field "M-Mms-Content-Location" in the case of the WAP message N3a, and has been inserted behind the known header field "Content Type" in the case of the WAP message N6a. The header field "X-Mms-Reply-Charging-Size" preferably has been inserted behind the known header field "X-Mms-Expiry" in the case of the WAP message N3a, and has been inserted behind the known header field "X-Mms-Read-Reply" in the case of the WAP message N6a.

TABLE 13

Newly defined header field in the WAP message N3a (M-Notification.ind).

| Name | Content | Comment |
| --- | --- | --- |
| "X-Mms-Reply-Charging-Size" | Value for reply charging size | Optional. Specifies the size of a Reply-MM. |
| ... | ... | ... |
| "X-Mms-Reply-Charging-Support-At-Recipient-MMS-Proxy-Relay" | Value for reply charging support at recipient MMS proxy relay | Optional. Indication of whether reply charging is supported at the recipient end. |

TABLE 14

Newly defined header field in the WAP message N6a (M-Retrieve.conf).

| Name | Content | Comment |
| --- | --- | --- |
| "X-Mms-Reply-Charging-Size" | Value for reply charging size | Optional. Specifies the size of a Reply-MM. |
| ... | ... | ... |
| "X-Mms-Reply-Charging-Support-At-Recipient-MMS-Proxy-Relay" | Value for reply charging support at recipient MMS proxy relay | Optional. Indication of whether reply charging is supported at the recipient end. |

The preferred embodiment of the present invention has been explained in detail with reference to the reply charging functionality, but the present invention likewise may be used for other functionalities requested by mobile radio subscribers.

In addition, the present invention may be used not only for multimedia messages, but also, by way of example, on a corresponding basis when sending and receiving SMS messages.

Indeed, although the present invention has been described with reference to specific embodiments, those of skill in the art will recognize that changes may be made thereto without departing from the spirit and scope of the invention as set forth in the hereafter appended claims.

The invention claimed is:

1. A method for transmitting a multimedia message via a network from a transmitting application to a receiving application during a data interchange, the method comprising the steps of:

using an originator network unit and a recipient network unit being identical or different than one another and situated in a domain of one or two service providers for the transmission;

using the multimedia message, which contains information regarding readiness of the originator to accept costs for a reply message from the recipient, to request a reply charging functionality in the domain of at least one service provider; and transmitting information regarding support of the requested reply charging functionality by the at least one of the originator network unit and the recipient network unit from one of the originator network unit and the recipient network unit to at least one of the transmitting application, the receiving application, and the other one of the originator network unit and recipient network unit.

2. A method as claimed in claim 1, wherein the information regarding the support of the requested functionality by the network unit, which is at an originator end in respect of one of the multimedia message and a reply message is sent to the recipient network unit.

3. A method as claimed in claim 1, wherein, if the requested functionality is supported by both the originator network unit and the recipient network unit, and the originator network unit is different from the recipient network unit, corresponding information is transmitted to the receiving application.

4. A method as claimed in claim 1, wherein, if the requested functionality is supported by both the originator network unit and the recipient network unit, the information regarding support of the requested functionality by the originator network unit is deleted by the recipient network unit and is not transmitted to the receiving application.

5. A method as claimed in claim 1, wherein the information regarding support of the requested functionality is transmitted from originator network unit to the transmitting application.

6. A method as claimed in claim 5, wherein a new header field with hexadecimal coding of a field name is used in the WAP message M-Send.conf, field values of the field name including the octet <octet 128> if the requested functionality is supported and including the octet <octet 129> if it is not supported.

7. A method as claimed in claim 1, wherein the information regarding support of the requested functionality is concomitantly transmitted to the receiving application by the recipient network in messages selected from at least one of a first group including MMI notification.REQ and M-notification.ind and a second group including MMI retrieve.RES and M-retrieve.conf.

8. A method as claimed in claim 7, wherein a new header field with hexadecimal coding of a field name is used in at least one of the WAP messages M-notification.ind and M-retrieve.conf, field values of the field name including the octet <octet 128> if the requested functionality is supported and including the octet <octet 129> if it is not supported.

9. A method as claimed in claim 1, wherein the receiving application evaluates the presence or absence of the information regarding support of the requested functionality by at least one of the originator network unit and the recipient network unit and outputs or refrains from outputting corresponding information for the user.

10. A network unit in a network in a domain of a service provider, the network unit associated with at least one of a transmitting application associated with an originator and a receiving application associated with a recipient, comprising:

a part embodied at least in hardware for transmitting multimedia messages being communicated from the transmitting application to the receiving application, the message being used to request a reply charging functionality, in the domain of a service provider, the message containing information regarding readiness of the originator to accept the costs for a reply message from the recipient; and a part embodied at least in hardware for interchanging information regarding support by the network unit of the requested reply charging functionality with at least one of the transmitting application, the receiving application, and another network unit involved in the data interchange.

11. A subscriber unit for communication in a network, comprising:

at least one receiving application associated with a recipient embodied at least in hardware for receiving multimedia messages from at least one network unit in a domain of a service provider, at least one of the messages containing information regarding readiness of an originator of the message to accept the costs for a reply message from the recipient; and a part embodied at least in hardware for receiving and evaluating reply charging information indicating whether the at least one network unit supports reply charging functionality allowing the originator to accept the costs for a reply message from the recipient.

12. A method as claimed in claim 1, wherein the network is a mobile radio network.

* * * * *